Sept. 6, 1966

R. R. BOCKEMUEHL 3,271,578

RADIATION MODULATOR

Filed Feb. 14, 1963

INVENTOR.
Robert R. Bockemuehl
BY
Paul J. Ethington
ATTORNEY

Sept. 6, 1966  R. R. BOCKEMUEHL  3,271,578
RADIATION MODULATOR
Filed Feb. 14, 1963  2 Sheets-Sheet 2

INVENTOR.
Robert R. Bockemuehl
BY
Paul J. Ethington
ATTORNEY

United States Patent Office 3,271,578
Patented Sept. 6, 1966

3,271,578
RADIATION MODULATOR
Robert R. Bockemuehl, Bloomfield Hills, Mich., assignor to General Motors Corporation, Detroit, Mich., a corporation of Delaware
Filed Feb. 14, 1963, Ser. No. 258,465
7 Claims. (Cl. 250—213)

This invention relates to the modulation of electromagnetic energy and, more particularly, to the performance of such modulation by controlling the energy transmission qualities of a semiconductor element with radiation energy sources having predetermined output wavelengths.

In accordance with the present invention, it is possible to control the transmission of relatively short wave light by varying the electromagnetic transparency of a semiconductor device with incident relatively long wavelength electromagnetic energy. This is accomplished by placing a semiconductor device in the transmission path of a primary source of relatively short wavelength radiation, for example, radiation within the visible frequency range. The properties of the semiconductor material are such that it is normally transparent to the short wavelength radiation. To modify the normal properties of the material, a biasing means is operatively associated with the semiconductor device to provide within the material a region which is highly absorptive to the short wavelength radiation. A source of controlling or modulating radiation is also directed toward the semiconductor device and is effective to alter the nature of the absorption region in accordance with the magnitude of the modulating radiation to counterbalance the effect of the biasing means and, thereby, selectively control the degree of transparency of all or a part of the semiconductor device to the relatively short wavelength radiation.

A further function performed by the present invention is an effective conversion of the wavelength of electromagnetic energy. For example, it is possible, in accordance with the invention, to convert from invisible infrared radiation to visible radiation. This is accomplished by selecting the properties of the semiconductor material to bear a predetermined relation to the wavelengths of the primary and controlling sources of radiation. If, as suggested above, the primary source emits visible energy and the controlling source energy is in the infrared region, the infrared energy source is effective to modulate or control the transmission of visible energy through the semiconductor element. The effect is then to convert an input of infrared radiation into an output of visible radiation.

It is a further object of the present invention to provide a system for the amplification of electromagnetic energy. This is accomplished by controlling the absorptive nature of the absorption region of the semiconductor element such that transmission of the relatively short wavelength radiation through the semiconductor creates a photoconductive condition which completes an energizing circuit through the semiconductor to an additional source of radiation. This additional source may have an output of relatively long wavelength radiation which, in turn, may be employed to modulate a second semiconductor modulating element. This cascaded arrangement may be extended as will become more apparent in the following.

The present invention also provides a means for converting relatively long wave electromagnetic energy images or intensities into images or intensities of a visible wavelength. This is accomplished through the provision of a plurality of semiconductor elements of desired size in accordance with desired resolution, which plurality of elements is individually responsive to the intensity of relatively long wave invisible radiation incident thereon. In this manner, the individual semiconductor devices may be rendered transparent or non-transparent or any degree therebetween to a source of visible energy.

In a particular embodiment of the present invention, it is also possible to provide an image memory means wherein the projected area of variable intensity long wavelength radiation is used to modulate or modify the transparency of at least one semiconductor device to incident relatively short wavelength radiation. Means are provided in conjunction with the semiconductor device such that rendering the semiconductor device transparent to the short wavelength radiation excites a luminescent means capable of producing relatively long wavelength radiation which will sustain the transparency of the semiconductor devices.

Briefly describing the basic invention, a semiconductor material, such as cadmium sulfide, is known to possess markedly different transmission characteristics to incident energy waves of different wavelengths. Accordingly, it has been convenient to define what is known as the absorption edge. The absorption edge represents a wavelength limit at which the transparency of the semiconductor material to electromagnetic radiation changes rather abruptly. Low energy radiation having a wavelength longer than the absorption edge wavelength will be readily transmitted through the semiconductor material, whereas higher energy radiation having a shorter wavelength than the absorption wavelength will be absorbed by the semiconductor material to a great degree. It has been shown in the prior art that the energy transmission quality of a particular semiconductor material is affected by a generation of electron-hole pairs within the material. The present invention, thus, provides biasing means operatively associated with the semiconductor material to set up a depletion layer in the semiconductor material. This may be accomplished by connecting a source of potential across the semiconductor to reverse bias the semiconductor material to provide a layer in which electrons are relatively scarce, thus, causing a region of positive space charge. A high field intensity exists within this region of space charge. Within this high field strength area, the energy required of an incident photon to produce electron-hole pair generation is significantly less than that which is required in a portion of the semiconductor which is not under the influence of the electric field. Thus, in the unbiased condition, the semiconductor material has a characteristic absorption wavelength, such that an incident photon having less than the required energy does not produce electron-hole pair generation and will, accordingly, be transmitted through the semiconductor material without absorption. However, in the biased condition an incident photon of less than the previously required energy may, in the depletion layer, cause electron-hole pair generation and be absorbed. Therefore, the effect of the space charge in the depletion layer is to shift the absorption edge to a longer wavelength. This is to say that electromagnetic energy of a particular wavelength, only slightly longer than the absorption edge wavelength, may pass substantially unabsorbed through the semiconductor material in an unbiased condition while being substantially absorbed by the semiconductor material in the biased condition.

As previously mentioned, the depletion layer is characterized by high positive space charge. This space charge is produced by the absence of electrons or presence of holes in the depletion layer caused by repelling the electrons within the depletion layer. A source of electromagnetic radiation having a relatively short wavelength which is only slightly longer than the normal absorption edge wavelength of the unbiased semiconductor material is positioned to direct energy therefrom onto the semiconductor element. With the biasing means connected such that the absorption edge is shifted to a degree which causes absorption of the realtively short wavelength energy, it has been stated that this energy will be absorbed. This is caused by the freeing of electrons from what is known as the valence band by imparting thereto sufficient energy, measured in electron volts, to raise an electron to what is known as the conduction band. The electrons, being highly mobile, will be immediately swept out of the depletion layer. However, the relatively immobile holes created by the raising of electrons from the valence band to the conduction band will be immediately trapped in hole trap centers within the semiconductor material. These hole trap centers are sufficiently deep to prevent a giving up of the hole by thermal agitation. Therefore, in the depletion layer, the positive space charge is primarily due to the presence of trapped holes.

A source of relatively low energy radiation is also positioned such that the output thereof is incident upon the semiconductor. The output of this low energy source is sufficient to excite electrons within the semiconductor from the valence band to the intermediate level of a trapped hole. At this point a recombination takes place which may be thought of as being equivalent to freeing a trapped hole. This action tends to reduce the space charge density since the positive charge of a hole is now nullified by an electron having a negative charge. Since the electric field within the depletion layer is dependent upon the space charge density, a decrease in the space charge is effective to decrease the field. With a decrease in the field, more energy is required to shift electrons from the valence band to the conduction band. Accordingly, radiant energy which produces electron-hole pairs in a high field region may not produce electron-hole pairs under the reduced field condition which is produced by the incident long wave radiation. Since the radiant energy will not be absorbed unless it is of sufficient energy level to produce electron-hole pair generation, it will be transmitted through the semiconductor material. Thus, the effect of the second source of relatively long wavelength energy is to shift the absorption edge back toward a shorter wavelength. It can be seen that a source of relatively long wavelength radiation may, thus, be employed to modulate the transmission quality or transparency of the semiconductor material to the incident relatively short wavelength radiation.

The invention and the various embodiments thereof will be more readily comprehended upon reading of the following specification which is to be taken with the accompanying drawings of which:

Figure 1:
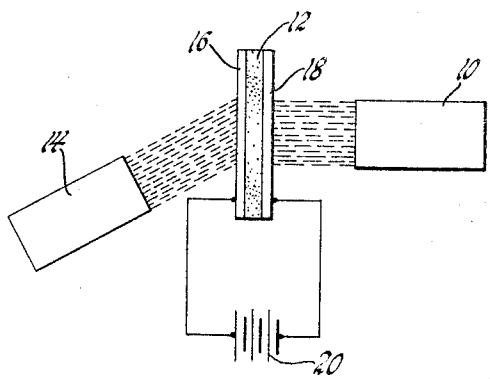
FIGURE 1 is a diagrammatic representation of a basic embodiment of the invention.
Figure 2:
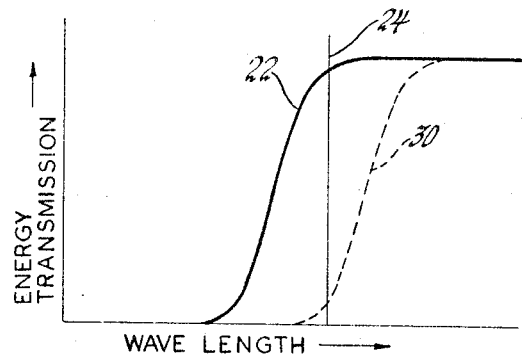
FIGURE 2 is a graph illustrating the relation between incident radiation wavelengths and the optical transmission qualities of a suitable semiconductor material.

Referring now to FIGURE 1, there is shown a system for modulating or valving the relatively short wavelength energy from a source 10 by controlling the transmission quality of a semiconductor element 12 in accordance with the intensity of relatively long wavelength radiation from a modulating source 14. In accordance with the present invention, the semiconductor element 12 is disposed between two electrodes 16 and 18 across which is connected a D.C. source in the form of a battery 20. The elec-
trodes must form a potential barrier which charge carriers cannot cross even though the external voltage is applied. The semiconductor element 12 may be composed of a suitable material, such as cadmium sulfide, in which a sharp transition from opaque to transparent characteristics is known to occur at 5150 Angstroms which is within the visible wavelength range. This wavelength is, thus, the absorption edge of the material and corresponds to the energy gap of 2.4 electron volts. As previously stated, this absorption edge represents the photon energy at which electron-hole pair generation occurs resulting in high photon absorption and low light transmission. The source 10 may then comprise a source of monochromatic energy in the visible range having a wavelength slightly longer than the absorption edge wavelength of cadmium sulfide. Referring briefly to FIGURE 2, if the absorption characteristics of cadmium sulfide are represented by the curve 22 and the wavelength of energy from source 10 is represented at 24, it may be seen that the wavelength of energy from source 10 is high up on curve 22 indicating efficient transmission through the semiconductor element 12.

Figure 3:
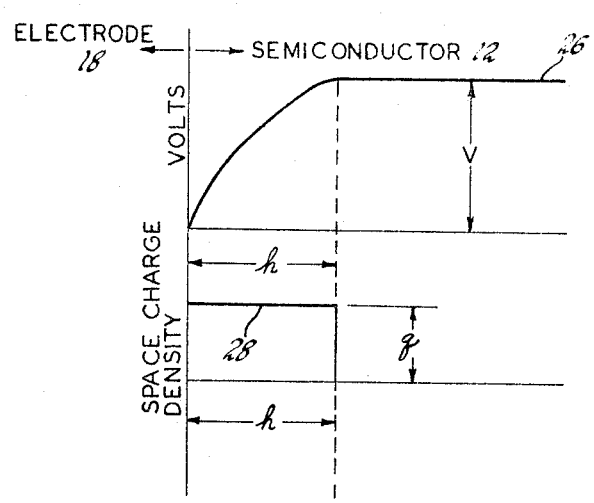
FIGURE 3 is a graph illustrating the relation between the potential distribution in the depletion layer and the space charge density in the depletion layer.

Describing now the operation of the system of FIGURE 1, reference will be taken to FIGURES 2 and 3. By suitably connecting the negative terminal of the battery 20 to the electrode 18, which is extremely thin and may be deposited on the element 12 by conventional vacuum deposition means, there will exist within the semiconductor element 12 adjacent the electrode 18 a region within which electrons have been repelled from the negatively charged electrode 18. This region is known as a depletion layer and exists in element 12 adacent electrode 18. It should be noted at this time that a connection of the battery 20 opposite to that shown in FIGURE 1 will merely result in the depletion layer being set up adjacent electrode 16. The potential distribution within this depletion layer is shown by curve 26 of FIGURE 3. As indicated, the voltage at the intersection of electrode 18 and semiconductor 12 is zero and increases to the value of the battery 20 over a distance $h$ into the semiconductor element 12. Due to the absence of electrons from the depletion layer, that region contains a positive space charge density indicated by curve 28 of FIGURE 3. It can be shown from Poisson's equation that a dependent relationship exists between the applied voltage of the battery 20, the depletion layer thickness $h$, the space charge density $q$. It may further be shown that the electric field intensity within the depletion layer is proportional to the area under curve 28 and is, therefore, directly related to the space charge density $q$ and the depletion layer thickness $h$.

As previously indicated, with the existence of the depletion layer within the semiconductor element 12, electron-hole generation within the depletion layer may be produced by radiation of a lower energy or longer wavelength than that required under unbiased conditions. This is to say that the wavelength of energy from the source 10 of visible light may no longer be transmitted through the semiconductor element 12 but will be absorbed therein. The effect of the bias through the battery 20 is, thus, to shift the absorption edge to longer wavelength as indicated by the dotted curve 30 of FIGURE 2. It may be seen that the wavelength of energy from source 10, as indicated at 24 of FIGURE 2, is now very low on curve 30 indicating a low optical transmission.

By irradiating the semiconductor element 12 with energy from the modulation source 14, which in accordance with the present invention is in the infrared range, the space density within the depletion layer may be influenced as was outlined in the earlier material. That is, the infrared radiation from source 14 is effective to raise electrons to the intermediate level of a trapped hole. The resulting decrease in the positive space charge density effects a decrease in the electric field and accordingly shifts the effective absorption edge back toward shorter wavelengths as shown in FIGURE 2. This infrared quenching, this, terminates the electron-hole pair generation caused by radiation from source 10 and, therefore, terminates the absorptive process of photons from source 10. Accordingly, the semiconductor element 12 will be transparent to the energy from source 10 at the wavelength indicated at 24 of FIGURE 2.

Describing the elements of FIGURE 1 in greater detail, the electrodes 16 and 18 are thin to the point of transparency and may be vacuum deposited onto the cleaned surfaces of the element 12. Suitable electrode materials which produce the necessary potential barrier include copper, gold, silver and tellurium. Copper is a preferred material, since impurity centers may form the necessary hole traps in the material of element 12. This may be accomplished by heating a copper electrode slab for a few minutes to diffuse copper impurities into the slab. The semiconductor element may be constructed of a thin slab of a semiconductor material such as zinc or cadmium sulfide, or zinc or cadmium selenium, all of which have absorption edge wavelength within the visible range. The absorption edge wavelength of cadmium sulfide has been previously cited as being approximately 5200 Angstroms well within the visible range. In this case the modulation source 14 may provide infrared energy having a wavelength of approximately 12000 Angstroms. Thus, it is seen that by controlling the output of source 14 to render the semiconductor element 12 transparent or non-transparent to the visible energy from source 10, an effective infrared to visible wavelength conversion is effected.

Figure 4:
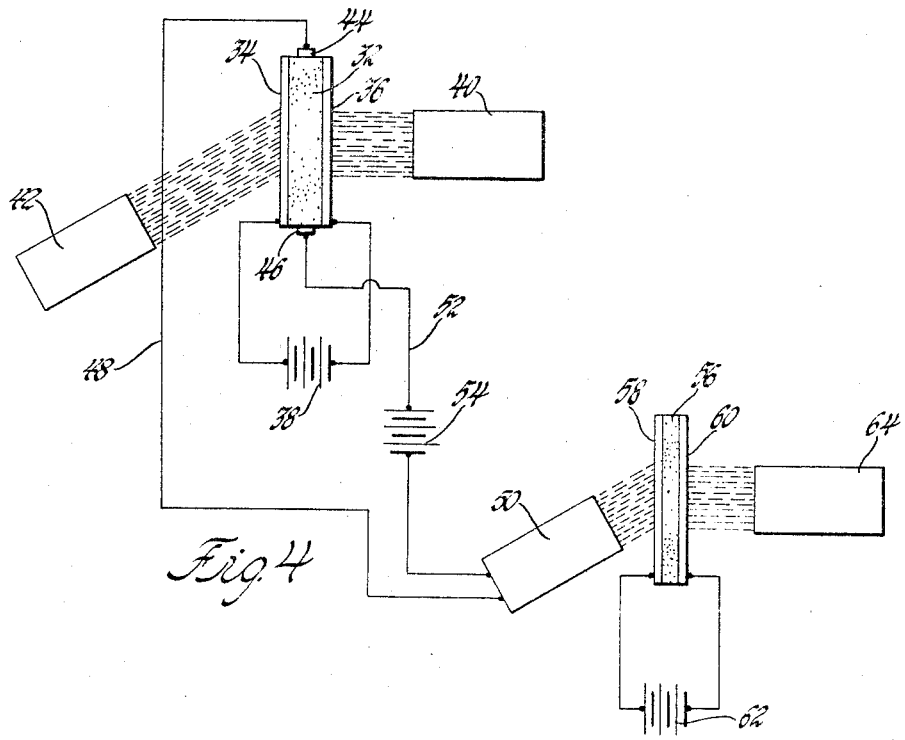
FIGURE 4 is a diagrammatic illustration of an amplification and conversion system embodying the present invention.

Referring now to FIGURE 4, the present invention is shown embodied in a cascaded arrangement of semiconductor devices for providing amplification and/or further wavelength conversion of the radiant energy signals. In accordance with this embodiment a semiconductor element 32, which may be cadmium sulfide or another suitable material, has bonded to the opposite surfaces thereof electrodes 34 and 36 to form the proper potential barrier at the junction thereof with the semiconductor element 32 as previously described. Connected across the electrodes 32 and 34 is a battery 38 which is effective to shift the absorption edge to longer wavelength as was described with reference to FIGURES 1 and 2. A source 40 of short wave radiation is disposed such that the output thereof is directed toward the semiconductor 32. The output of the source 40 is of a wavelength which will be absorbed in the depletion layer of the semiconductor element when biased by the battery 38, but which would otherwise be longer than the unbiased absorption edge wavelength. To modulate the transparency or opacity of the element 32, a source 42 of relatively long wavelength radiant energy is also disposed so as to direct long wavelength energy into the depletion layer which is formed by the battery 38 within the semiconductor element 32 adjacent the junction of electrode 36. It may be seen that the combination of elements 32, 34, 36, 38, 40 and 42 operate in accordance with the description given with respect to FIGURE 1.

As has been previously suggested, the conductivity of the element 32 is greatly influenced by the presence or absence of a photoconductive action which is produced in the body of element 32 by radiation from source 40. It can be seen that modulation of the absorptivity of the depletion layer adjacent electrode 36 is effective to modulate the amount of radiation from source 40 which reaches the element 32. Since control of the absorption of the output from source 40 is controlled by the long wave source 42, it can be seen that the source 42 also controls the photoconductivity of the element 32. To make use of this change in conductivity a secondary pair of electrodes 44 and 46 are connected across opposite surfaces of the element 32. Electrode 44 is electrically interconnected with a conductor 48 which is connected to a second source 50 of long wavelength energy. Electrode 46 is also connected via conductor 52 and a D.C. source in the form of a battery 54 to the source 50. It may be seen that the source 50 has an energizing circuit comprising battery 54, conductor 52, element 32 and conductor 48. Accordingly, the output of the source 50 will be determined by the current flow through conductors 52 and 48, which current flow will in turn be determined by the conductivity of element 32.

A second semiconductor element 56 having electrodes 58 and 60 disposed on opposite surfaces thereof is positioned in the output path of the source 50. A battery 62 is connected across the electrodes 58 and 60 to shift the absorption edge in the manner previously described. A short wave source 64 is also disposed so as to direct the output radiant energy thereof onto the semiconductor element 56. The absorption edge of the element 56 and the wavelength of the output energy from sources 64 and 50 are once again related such that element 56, when biased by battery 62 will be transparent to the energy from source 64 only when properly irradiated by energy from source 50.

The operation of the system of FIGURE 4 is, thus, obvious from the prior description and, it may be seen that by controlling the conductivity of semiconductor element 32 by the intensity of radiation from the long wave source 42 the transparency of semiconductor element 56 will accordingly be controlled. Considering an overall transfer characteristic it may be seen that the input to output wavelength conversion may now be defined in terms of the wavelength of source 42 and the wavelength of source 64. It is also apparent that the semiconductor element 56 may be omitted and the source 50 used as the output device. Inasmuch as it is entirely within the scope of this invention to employ semiconductor materials for elements 32 and 56 which have significantly different absorption edges, it may be seen that the wavelength of source 40 need not correspond with the wavelength of source 64. Accordingly, great wavelength conversion is attainable. Similarly, signal amplification is also readily attainable through this cascaded arrangement. It is to be understood that the system of FIGURE 4 may be extended beyond the two-tier system illustrated.

Figure 5:
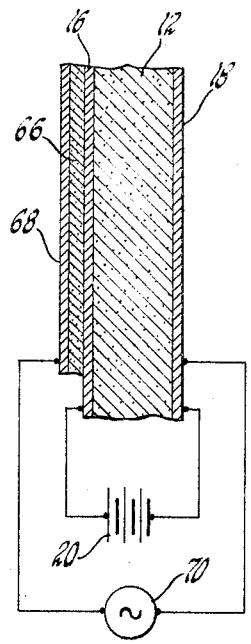
FIGURE 5 is a cross-sectional view of an embodiment of the invention which provides for memorization of the incident radiation pattern.

FIGURE 5 illustrates an arrangement which may be substituted in place of the arrangement of FIGURE 1 for the purpose of providing a memory device which is effective to maintain transparency of the semiconductor element 12 of FIGURE 1 in the absence of radiation from source 14. In accordance with this objective the semiconductor element 12 is once again sandwiched between electrodes 16 and 18 across which is connected battery 20 for the purpose of switching the absorption edge from curve 22 to curve 30 as shown in FIGURE 2. Additionally, deposited upon the outer surface of electrode 16 is a layer 66 of electro-luminescent material such as zinc sulfide. It is well known that when a field of proper intensity is set up across a material such as zinc sulfide it will become luminescent and emit radiation of a characteristic wavelength. Therefore, a third electrode 68 is vacuum deposited on the outer surface of the electro-luminescent layer 66. An A.C. source 70 is connected across electrodes 18 and 68 to form an energizing circuit for the electro-luminescent layer 66.

It has been discussed with reference to FIGURE 4 that the electrical conductivity of the semiconductor material be modulated in accordance with the output from the long wave source 42 of FIGURE 4. Therefore, the conductivity between electrodes 18 and 68 may be varied or modulated in accordance with the conductivity of the semiconductor element 12. This conductivity is determined to be less than that which will allow significant conductance of the energy from the A.C. source 70 when the semiconductor element 12 is not irradiated by long wave energy from the source 14. A certain field intensity will exist across layer 66 when element 12 is non-conductive. This field is insufficient to produce luminescence of layer 66. However, upon element 12 becoming conductive the resistance between electrodes 18 and 68 will be greatly decreased such that a much higher field will be set up in the electro-luminescent layer 66. This high field will cause layer 66 to emit radiant energy. The material for the electro-luminescent layer 66 is selected such that the wavelength of the emitted energy corresponds with that of source 14.

Discussing now the operation of the modification of FIGURE 5, it is assumed that this arrangement is substituted in the system of FIGURE 1. Accordingly, the battery 20 shifts the absorption edge of the element 12 so as to be opaque to the energy from source 10. Irradiation of the element 12 by source 14 will cause the element 12 to become transparent to the radiant energy from source 10 and also conductive to the energy from the A.C. source 70. Therefore, the electro-luminescent layer 66 will begin to emit energy corresponding to the wavelength of source 14. This energy is sufficient to maintain the optical transparency of element 12 even in the absence of energy from source 14. Therefore, the arrangement of FIGURE 5 provides a convenient memory device which is capable of storing information as to the intensity of the source 14. The memorization may be extinguished or reset merely by interrupting the output of source 10.

To more clearly realize the utility of the memory arrangement of FIGURE 5, let us assume that the radiation pattern from source 14 is important, and that the particular configuration thereof is desired to be known. For example, it may be desired to outline the shape of an object or otherwise provide an optical image on the surface of element 12. It may readily be seen that this can be accomplished by providing a two-dimensional array of semiconductor elements 12 which are individually biased and, therefore, individually responsive to varying intensities of infrared energy from source 14. Since each element may have an associated electro-luminescent layer 66, the two dimensional array may indicate and remember the intensity variations in the pattern of the long wave source.

Figure 6:
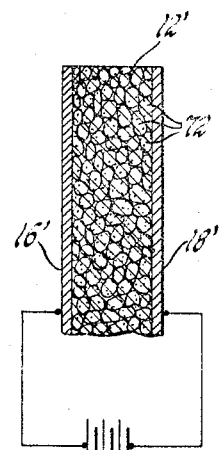
FIGURE 6 is a cross-sectional view of a high resolution image converter employing the present invention.

To obtain a high degree of resolution from an image converter employing an array of semiconductor devices in accordance with the present invention, the arrangement of FIGURE 6 may be substituted into the system of FIGURE 1. This arrangement includes a semiconductor element 12' consisting of a continuum of sintered semiconductor crystallites 72. The crystallites 72 are disposed between electrodes 16' and 18' across which is connected battery 20' for the purpose of shifting the absorption edge of each of the crystallites as was previously described with respect to FIGURE 1. The element 12', consisting of very small individual crystallites 72 which are insulated from one another by what may be also a binding material, possess an overall characteristic similar to that of a homogeneous semiconductor element such as 12 of FIGURE 1. However, much greater definition or resolution of adjacent areas of different intensity in the total area which is irradiated by source 14 may be readily detected since there will be a relatively restricted flow of charge within the element 12' due to the fact that the crystallites 72 are mutually insulated. A depletion layer in each of the crystallites may be formed by connecting the battery 20' across the electrodes 16 and 18. These depletion layers will occur within the crystallites adjacent the boundary of the junction with other crystallites. Accordingly, this depletion layer will possess the high field characteristics required for electron-hole generation and absorption of the visible energy from source 10. In accordance with the previous description this field intensity may be controlled by decreasing the space charge density with irradiation from a long wave source such as 14.

It is to be understood that while the present invention has been described with reference to specific embodiments thereof, it is not so limited as further modifications and extensions thereof will be apparent to those skilled in the art. For a definition of the invention reference should be had to the appended claims.

What is claimed is:

1. Apparatus for modulating electromagnetic energy including: a semiconductor element having an absorption edge wavelength, the element being thin along at least one dimension to be relatively transparent to energy directed along said one dimension and which energy is of a wavelength longer than the absorption edge wavelength; a first source of electromagnetic energy having a predetermined wavelength longer than the absorption edge wavelength and disposed to direct radiation onto the semiconductor element substantially along the one dimension; biasing means to produce a depletion layer in the semiconductor element transverse to the direction of the output from the first source and having therein a high space charge density thereby to effectively shift the absorption edge wavelength to a wavelength longer than said predetermined wavelength; and a second source of electromagnetic energy of a wavelength substantially longer than said predetermined wavelength and positioned to direct the output thereof into the depletion layer thereby to shift the effective absorption edge wavelength toward a wavelength shorter than the predetermined wavelength.

2. Apparatus as defined in claim 1 wherein the semiconductor element is rendered photoconductive by radiation of the predetermined wavelength and the depletion layer is produced in that portion of the body of the semiconductor element which is closest to the first source, the combination including circuit means connected across the semiconductor element and a source of radiant energy interconnected with the circuit means thereby to be controlled by the photoconductivity of the semiconductor element.

3. Apparatus as defined by claim 1 wherein the first source produces electromagnetic energy having a wavelength in the visible portion of the spectrum and the second source produces electromagnetic energy having a wavelength in the infrared portion of the spectrum.

4. Apparatus as defined by claim 1 including: a layer of electroluminescent material disposed adjacent the semiconductor element and energizable to produce radiation of a wavelength equal to that of the second source; and energizing means connected across the semiconductor element and the electro-luminescent layer and effective to energize the electro-luminescent material whenever the absorption edge wavelength is shorter than the predetermined wavelength.

5. Apparatus for modulating radiant energy including: a semiconductor element having a normal absorption edge wavelength, the element being thin along at least one dimension to be relatively transparent to energy directed along said one dimension and which energy is of a wavelength longer than the absorption edge wavelength; a source of radiant energy having a predetermined wavelength longer than the normal absorption edge wavelength and positioned to direct radiant energy onto the semiconductor element substantially along the one dimension; means to produce a depletion layer in the semiconductor element transverse to the radiation from the source and effective to shift the absorption edge to a wavelength longer than the predetermined wavelength; the depletion layer in the semiconductor element being characterized by a high space charge density; means to reduce the space charge density within the depletion layer thereby to reshift the absorption edge wavelength to a wavelength shorter than the predetermined wavelength; and radiant energy responsive means operatively connected to the last mentioned means to control the operation thereof thereby to control the degree to which the absorption edge wavelength is reshifted.

6. Apparatus for the amplification of radiant energy comprising: a first semiconductor element having a normal absorption edge wavelength; first biasing means connected across the first semiconductor element tending to shift the absorption edge to an effective wavelength which is longer than the normal wavelength; a first source of radiant energy disposed to direct the output thereof at the semiconductor element and having a predetermined output wavelength which is intermediate the normal and effective wavelengths; a second source of radiant energy disposed so as to direct the output thereof at the semiconductor element and having an output wavelength substantially longer than the predetermined wavelength thereby tending to prevent the shift in the absorption edge wavelength due to the biasing means; a second semiconductor element having second normal absorption edge wavelength; second biasing means connected across the second semiconductor element for shifting the absorption edge thereof to an effective wavelength which is longer than the second normal wavelength; a third source of radiant energy disposed to direct the output thereof at the second semiconductor element and having a predetermined wavelength intermediate the second normal and effective wavelength; a fourth source of radiant energy disposed to direct the output thereof at the second semiconductor element and having an output wavelength substantially longer than the second predetermined wavelength; and an energizing circuit connected to the fourth source for controlling the output intensity thereof and including the first semiconductor element whereby variations in the conductivity of the first semiconductor element are effective to vary the output intensity of the fourth source.

7. An image converter including: a continuum of semiconductor crystals of a common material and having a normal absorption edge wavelength, the continuum being thin in at least one dimension to be relatively transparent to radiation directed along said dimension and which energy is of a wavelength longer than the absorption edge wavelength; D.C. biasing means for producing a depletion layer in each of said crystals thereby to shift the absorption edge to an effective wavelength greater than the normal wavelength; a first source of radiant energy disposed to direct the output thereof through said continuum along said one dimension and having a predetermined output wavelength intermediate the normal wavelength and the effective wavelength; and a second source of radiant energy disposed to direct the output thereof through the continuum along said one dimension and having a wavelength significantly longer than the predetermined wavelength thereby to shift the absorption edge back toward the normal wavelength.

References Cited by the Examiner
UNITED STATES PATENTS

| | | | |
|---|---|---|---|
| 2,692,950 | 10/1954 | Wallace | 280—83.3 |
| 2,776,367 | 1/1957 | Lehovec | 88—61 |
| 2,985,757 | 5/1961 | Jacobs et al. | 250—83.3 |
| 3,015,731 | 1/1962 | Van Santen et al. | 250—213 X |
| 3,025,763 | 3/1962 | Schwartz et al. | 88—106 X |
| 3,121,203 | 2/1964 | Heywang | 88—61 |

OTHER REFERENCES

Fowler: "Electro-Optical Circuit," IBM Technical Disclosure Bulletin, vol. 4, No. 1, p. 60, June 1961.

RALPH G. NILSON, *Primary Examiner.*

WALTER STOLWEIN, *Examiner.*

J. D. WALL, *Assistant Examiner.*